(12) United States Patent
Ku et al.

(10) Patent No.: US 7,359,890 B1
(45) Date of Patent: Apr. 15, 2008

(54) SYSTEM LOAD BASED ADAPTIVE PREFETCH

(75) Inventors: Chi Ku, San Ramon, CA (US); Arvind Nithrakashyap, San Mateo, CA (US); Ari W. Mozes, San Carlos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 480 days.

(21) Appl. No.: 10/142,257

(22) Filed: May 8, 2002

(51) Int. Cl.
*G06F 17/30* (2006.01)

(52) U.S. Cl. .......................... 707/2; 707/100; 707/200; 711/133

(58) Field of Classification Search .................... 707/1, 707/2, 3, 4, 5, 6, 7, 8, 9, 10, 100, 101, 102, 707/103, 104.1, 200; 711/150, 113
See application file for complete search history.

(56) References Cited

U.S. PATENT DOCUMENTS

| | | | |
|---|---|---|---|
| 5,293,609 A * | 3/1994 | Shih et al. ................... | 711/137 |
| 5,627,994 A * | 5/1997 | Levy et al. ................... | 711/150 |
| 5,812,996 A * | 9/1998 | Rubin et al. ..................... | 707/2 |
| 5,822,749 A * | 10/1998 | Agarwal ......................... | 707/2 |
| 5,940,838 A * | 8/1999 | Schmuck et al. ........... | 707/200 |
| 6,085,287 A * | 7/2000 | O'Neil et al. ................ | 711/113 |
| 6,449,694 B1* | 9/2002 | Burgess et al. ............. | 711/128 |
| 6,691,099 B1* | 2/2004 | Mozes ........................... | 707/2 |
| 6,738,866 B2* | 5/2004 | Ting ........................... | 711/133 |

OTHER PUBLICATIONS

"Hardware Strategies to Improve Database Application Performance", Whitepaper, 2001, http://www.seeksystems.com/HW%20Strategies%20Whitepaper.pdf, (4 pages).
U.S. Supreme Court Decision in a case KSR International Co. v. Teleflex Inc. et al., decided Apr. 30, 2007 (31 pages).

* cited by examiner

*Primary Examiner*—Yicun Wu
(74) *Attorney, Agent, or Firm*—Silicon Valley Patent Group LLP; Omkar Suryadevara

(57) ABSTRACT

A number, of the blocks of data to be prefetched into a buffer cache, is determined dynamically at run time (e.g. during execution of a query), based at least in part on the load placed on the buffer cache. An application program (such as a database) is responsive to the number (also called "prefetch size"), to determine the amount of prefetching. A sequence of instructions (also called "prefetch size daemon") computes the prefetch size based on, for example, the number of prefetched blocks aged out before use. The prefetch size daemon dynamically revises the prefetch size based on usage of the buffer cache, thereby to form a feedback loop. Depending on the embodiment, at times of excessive use of the buffer cache, prefetching may even be turned off. Although in one embodiment described herein the prefetch size daemon is implemented in a database, in other embodiments other kinds of applications and/or the operating system itself can use a prefetch size daemon of the type described herein to dynamically determine and change prefetch behavior.

27 Claims, 5 Drawing Sheets

SYSTEM LOAD BASED ADAPTIVE PREFETCH

BACKGROUND

Reading from a disk of a computer is very slow compared to accessing main memory. In addition, it is common to read the same part of a disk several times during relatively short periods of time. For example, one might first read an e-mail message, then read the letter into an editor when replying to it, then make the mail program read it again when copying it to a folder. By reading data from disk only once and then keeping the data in memory until no longer needed, the computer can be programmed to speed up all but the first read. This is called disk buffering, and the memory used for the purpose is called the buffer cache.

A relational database (available from Oracle Corporation) maintains its own buffer cache inside a portion of the main memory (called "system global area" and abbreviated "SGA") for each instance of the database. The database is typically installed in a computer (commonly called "server") of the type available from Sun Corporation, running the operating system Solaris or Unix. A server is a mid-sized computer where all the data is actually kept on a disk. Such a server may be coupled to one or more clients. Clients are typically Personal Computers (or "PCs") that pull data of the server in ways that are useful to the user (i.e., for display and interpretation).

A server typically executes a query supplied by a client, and in executing the query applies certain operators (as required by the query) to data in the database. When executing such queries, the server may be programmed to fetch data blocks ahead of time (in an operation called "prefetch") from disk, and store the data blocks in the buffer cache. Such prefetching of data blocks of a database table (which are pointed to by rowids often provided by an index) allows the query to execute quickly, by taking advantage of parallel I/O capability of the server. The number of data blocks that are prefetched may depend on the type of query as described in a white paper entitled "Hardware Strategies to Improve Database Application Performance" available at www-seeksystems-com%products%oracle app whitepaper-.pdf (wherein "." and "/" in the hyperlink have been replaced with "-" and "%" respectively).

U.S. Pat. No. 5,822,749 granted to Agarwal (that is incorporated by reference herein in its entirety) states the "Two types of prefetch exist: "hard" prefetch and "soft" prefetch. In a soft prefetch, if the system cannot fetch or retrieve the requested size (e.g., because sufficient memory does not exist), it will fetch the size which best matches the request (given that the request itself cannot be satisfied exactly). In a hard prefetch, in contrast, the amount prefetched must satisfy that which was requested. If the amount requested is unavailable for some reason, the system will nevertheless wait until it can satisfy the hard prefetch request alternatively, a value (e.g., NULL) can be returned, indicating that the client is to handle the inability to perform a hard prefetch. For example, if much contention exists for a particular size which has been requested for a hard prefetch, the system will wait until that size is available (or return). A hard prefetch is typically employed in those instances where system operation is greatly improved by large buffer I/O, such as when needed for creating a database. A hard prefetch will generally not be employed within the main transaction path." See also U.S. Pat. No. 5,812,996 (also incorporated by reference herein in its entirety).

We, the applicants, have found that prefetching of data blocks by prior art queries does not take into account the overall system load. Specifically, excessive prefetching may cause degradation in overall performance, e.g. if queries unilaterally prefetch data blocks identified by rowids from an index range scan, regardless of what is happening with other queries. For example, a query may prefetch data blocks that remain unused and need to be swapped out (to make room for data blocks prefetched by other queries), and the same data blocks have to be re-fetched later.

SUMMARY

In accordance with the invention, a number, of the blocks of data to be prefetched into a buffer cache, is determined dynamically at run time (e.g. during execution of a query), based at least in part on the load placed on the buffer cache. An application program (such as a database) is responsive to the number (also called "prefetch size"), to determine the amount of prefetching. A sequence of instructions (also called "prefetch size daemon") computes the prefetch size based on, for example, the number of prefetched blocks aged out before use. The prefetch size daemon dynamically revises the prefetch size based on usage of the buffer cache, forming a feedback loop. Depending on the embodiment, at times of excessive use of the buffer cache, prefetching may even be turned off. Although in one embodiment described herein the prefetch size daemon is implemented in a database, in other embodiments other kinds of applications use a prefetch size daemon of the type described herein. Alternatively, an operating system itself can use a prefetch size daemon to dynamically determine and change prefetch behavior for any application (including, for example, a database or a browser that prefetches links), so long as the application provides statistics to the daemon, and includes a mechanism to change the application's prefetch behavior.

DETAILED DESCRIPTION

In accordance with the invention, the number of blocks of data being prefetched is determined dynamically based on either on both of (1) the load of the cache, and (2) the clusterness of the data. The number of blocks that can be prefetched (referred to herein as "prefetch size") can be dynamically changed during execution, for a number of reasons depending on, for example (1) the number of blocks being prefetched by the application program as a whole, and (2) system workload, e.g., other application programs (or other instances of the same application program) active in the system.

Although a software method for automatically determining and updating the prefetch size is discussed below, e.g. in reference to FIG. 5, such a prefetch size can also be set in any other way that will be known to the skilled artisan in view of this disclosure, e.g. the prefetch size 14 (FIG. 1) may be set by a Database Administrator (DBA) through a script (which may use time of day or system demand to change prefetch size) or even manually through a user interface (although this is not recommended for some embodiment (discussed below), the change is based on usage of the buffer cache, e.g. if previously prefetched blocks are being aged out without being used then the prefetch size may be reduced, and depending on severity of usage of the buffer cache, in extreme cases prefetching may even be turned off.

In one embodiment, software (also called "query processing engine") that processes query plans 11A-11Z (see FIG. 1) (Z being the total number of query plans) in a relational database system (of the type available from Oracle Corporation, Redwood Shores, Calif.) is modified to include instructions (called "prefetch size management instructions") to adjust (or adapt), over time, the number of blocks of data that are prefetched. In one implementation, in deciding the number of data blocks to be prefetched, each query plane 11P (wherein $A \leq P \leq Z$) takes in account the prefetch size 14 set in the database system. Queries of plans 11A-11Z (FIG. 1) can include any operator normally used in a database system and that requires a buffer cache (such as full table scan or index range scan). Such query plans are modified (depending on the embodiment) to dynamically (e.g. periodically) during their execution, adapt their buffer cache usage, before continuing to prefetch their input data.

Figure 2:
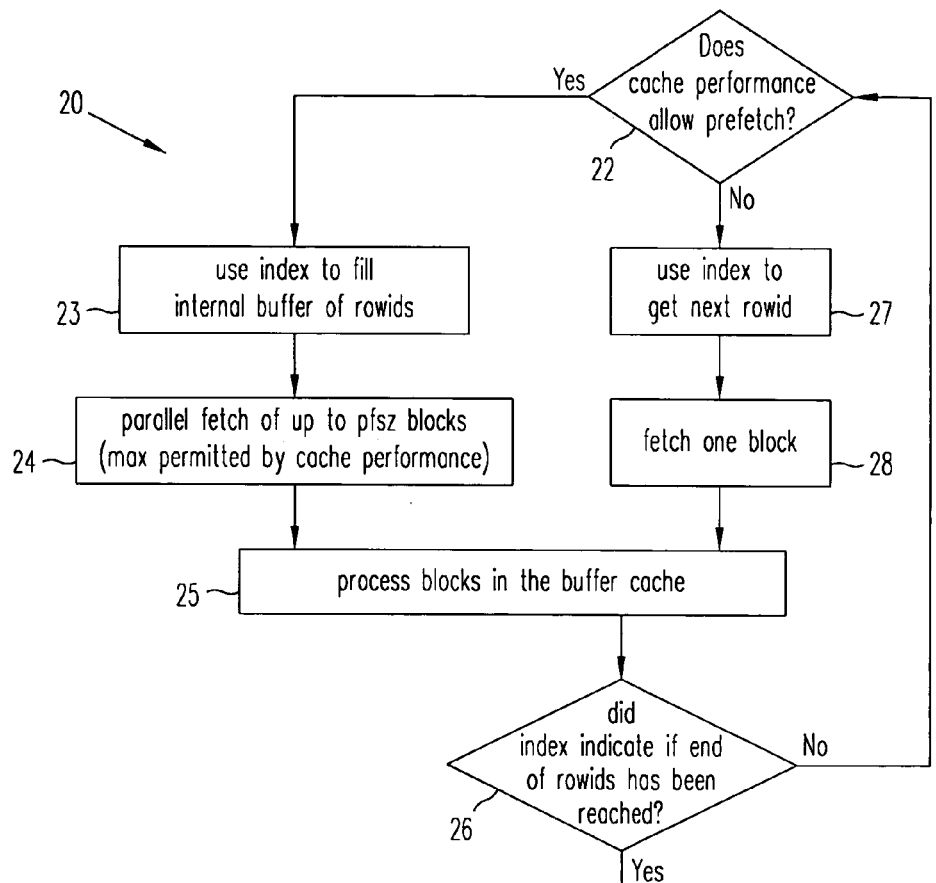
FIG. 2 illustrates, in a flow chart, acts performed by a query of FIG. 1.

One specific implementation illustrated in FIG. 2 performs the following acts. Specifically, each query plan 11P determines (see act 22 in FIG. 2) if performance of the buffer cache allows prefetch to be done. In this act, any method well known in the art may be used to evaluate cache performance, to ensure that a certain threshold has been reached in terms of a cost-benefit tradeoff. For example, a 50% reduction in I/O latency may be set as a minimum benefit, and this may require an effective prefetch size to be greater than or equal to 2. The effective prefetch size may be computed to be the number of expected blocks not in the cache: clustering*cache-miss-rate*prefetch size. If this product (expected number of blocks not in cache) is less than 2 for example, the I/O latency reduction is not enough to justify the overhead associated with determining what has already been fetched into the buffer cache. If this product is greater than 2, then query plan 11P goes to act 23 (described next) and otherwise goes to act 27 (described later).

In one specific example, if the following condition is satisfied in act 22 then prefetching is turned on and otherwise turned off:

min (no. of rowids fetched from index, pfsz)
   $*CM*CF \leq 2$ wherein
CM is the cache miss rate computed as the number of physical "reads" that are issued to disk divided by the number of logical "gets" that are issued to main memory;
CF is the clustering factor which is a property of the index, and is normally precomputed and present in a data dictionary (stored in a data structure unique to each query, which data structure also contains, e.g. the location of an internal buffer for holding rowids, size of the internal buffer, and current pointer in the internal buffer). A lower CF value indicates that the individual rows (that are being fetched) are concentrated within fewer blocks in a table (and the cost of returning these fewer blocks is low). Conversely, a high clustering factor indicates that the individual rows are scattered more randomly across blocks in the table (rather than being collocated). Therefore, a high clustering factor means that it costs more to fetch rows by rowid using a range scan, because more blocks in the table need to be visited to return the data being sought.

In act 23 (FIG. 2), each query plan 11P uses an index to determine a number of rowids that are inserted into an internal buffer. The size of the internal buffer may be selected in any manner well known in the art, although in one specific example a buffer sufficiently large to hold 40 rowids is used. The rowids identify data blocks that are to be fetched from disk..

Figure 1:
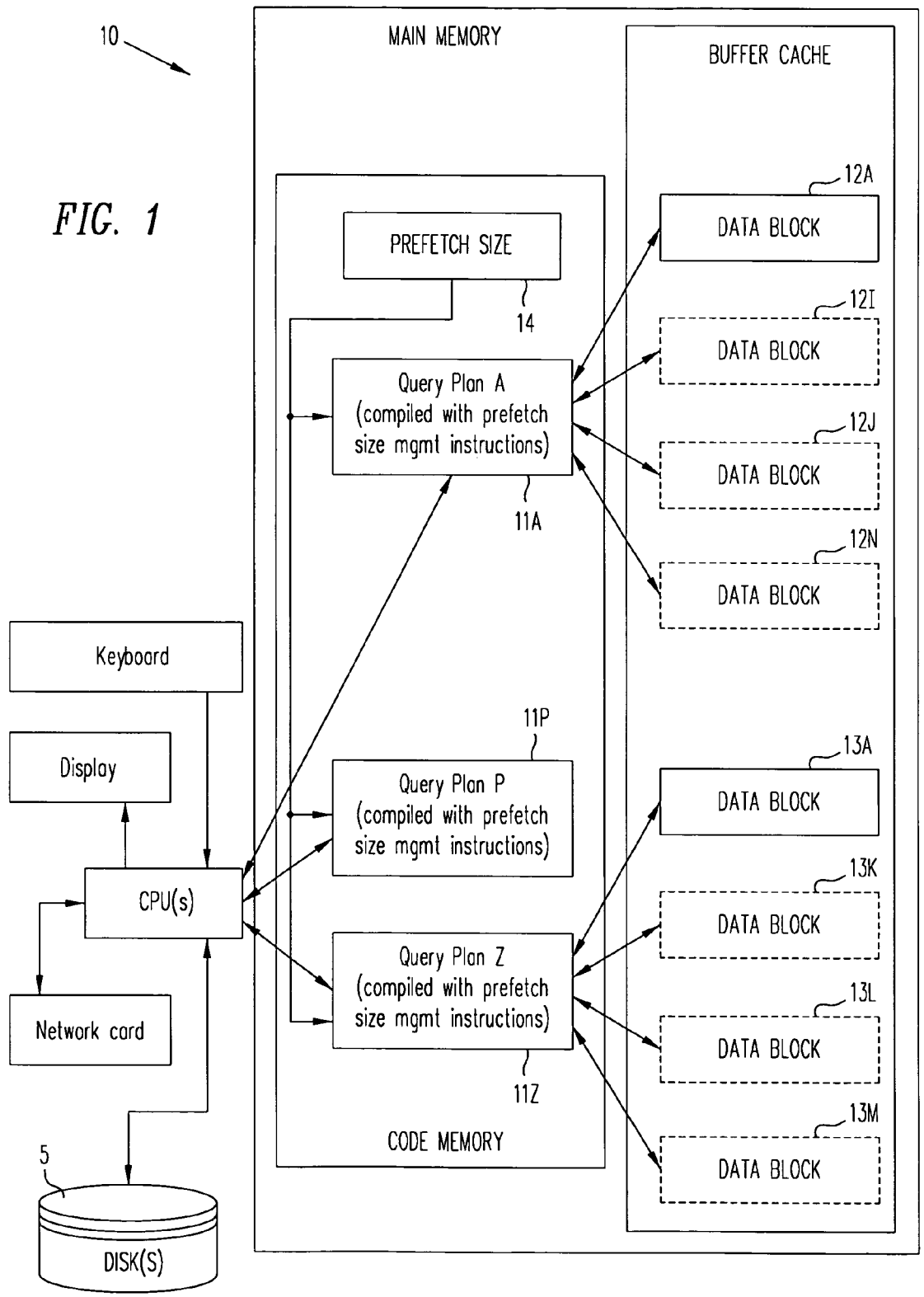
FIG. 1 illustrates, in a block diagram, data and code in memory of one embodiment of the invention.

Next, in act 24, query plan 11P performs a parallel fetch of the data blocks (such as blocks 12A-12N in FIG. 1) into the buffer cache, and the number of data blocks being fetched is limited to be no more than the prefetch size 14 (see FIG. 1; labeled as "pfsz" in FIG. 2, act 24). Specifically, query plan 11P determines the number of blocks to be prefetched depending on a number of factors, such as the number of rows requested by the user query. Note that prefetching is performed automatically in one embodiment when pfsz>1. Alternatively, the user may indicate that the value pfsz be used as the nominal value for the number of data blocks to be prefetched.

In one example, buffer cache size is 100 blocks, and an overall quota of only 10% is to be used for prefetching. Therefore, of the 10 blocks available, if there are two queries, then prefetch size pfsz is set to 5 blocks. Note that in one embodiment, the same prefetch size pfsz is used for all queries although in other embodiments, different prefetch sizes may be used for each of a number of different queries (e.g. depending on the priority of a query).

Thereafter, query plan 11P goes to act 25 to actually process the blocks (one at a time) that are now located in the buffer cache. Note that blocks are processed by a query processing layer of the database as and when needed. The expectation is that the blocks will stay in the buffer cache as long as they are needed. If blocks are not staying in the buffer, prefetching is wasteful and hence the prefetch size needs to be reduced (so fewer blocks are prefetched and all prefetched blocks end up getting used).

Next, query plan 11P goes to act 26 (FIG. 2) to check if use of the index has indicated that an end of the rowids has been reached. If so, then query plan 11P finishes processing any remaining blocks in the buffer cache and thereafter ends (see act 29 in FIG. 2), and alternatively, query plan 11P returns to act 22 (described above).

In act 22, if prefetch is not permitted, e.g. due to heavy load in the buffer cache, then query plan 11P goes to act 27 and fetches only one block (e.g. block 12A). Because query plan 11P can prefetch only one block, depending on external factors such as buffer cache load, only block 12A is shown in a solid box in FIG. 1, and the rest of the blocks 12I-12N are shown in boxes of dashed lines.

Although a method 20 illustrated by the flow chart in FIG. 2 has been described above in reference to prefetching for a single key, the method can also be used for multi-key prefetching, in case of, for example, the join operator. In such a case, if the prefetch size pfsz is larger that the number of rowids available for a given key, then rowids for another key may be used thereby to take full advantage of the available space in the buffer cache.

Although a method 20 illustrated by the flow chart in FIG. 2 has been described above, in one embodiment a state machine 30 (FIG. 3) is implemented by each query plan 11P. Specifically, when performing prefetch, each query plan 11P transitions between the four states 31-34 as follows. Query plan 11P initially starts in state 31 and if prefetch size pfsz is greater than the number of prefetched rowids in the internal buffer (which may be computed as described below in reference to FIG. 4 in one embodiment), query plan 11P makes a transition to state 32 (labeled as "load" in FIG. 3). In state 32, query plan 11P repeatedly fetches the rowids into a rowid buffer, until the rowid buffer becomes full. When the rowid buffer does become full, query plan 11P makes a transition to state 33 (labeled as "prefetch" in FIG. 3).

In state 33, query plan 11P initially prefetches as many blocks as possible into the buffer cache (depending on the room available in the buffer cache). Depending on the embodiment, the act of prefetching may be done synchronously or asynchronously with the next act, of processing the data blocks. As noted earlier, the data blocks are processed as and when necessary. In one specific embodiment, not all the prefetched data blocks are processed in state 33. Instead, when only pfsz number of data blocks are left in the buffer cache, query plan 11P transitions from state 33 to state 32. The presence of pfsz number of data blocks in the buffer cache is useful in the asynchronous embodiment, so that these blocks can be processed simultaneous with the prefetching.

Therefore, when prefetch size pfsz is smaller than the number of prefetched rowids in the internal buffer, then query plan 11P makes a transition 35 back to state 32. In state 32, additional rowids are fetched from the index into the rowid buffer, and as soon as the rowid buffer becomes full again, query plan 11P returns to state 33. In this manner, the two states 32 and 33 are repeatedly visited, until in state 32 use of the index indicates that no more rowids are available (e.g. sends an end of file). When the end has been reached, query plan 11P makes a transition to state 34 to complete the processing of previously prefetched data blocks that remain in the buffer cache. Once all blocks have been processed, query plan 11P leaves state 34, having concluded all the necessary data processing that required access to disk.

Figure 4:
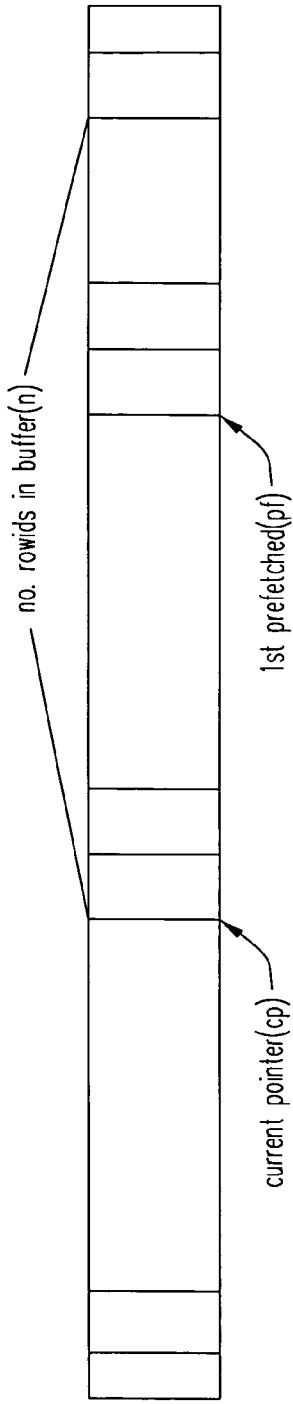
FIG. 4 illustrates, in a block diagram, a circular queue used in one example of the state machine of FIG. 3.

The number of prefetched rowids that are currently present in the internal buffer need to be determined in ways unique to the implementation. For example, if an internal buffer for holding the rowids is implemented as a circular buffer, as illustrated in FIG. 4, then the following formula is used in this specific embodiment no. of prefetched rowids=$(pf>=cp)$?

$(n=(pf-cp)):(((pf+bsz)-cp))$ where bsz is the buffer size of the internal buffer;
pf is the location of a pointer to the first prefetched rowid; and
cp is the location of a pointer indicating the next rowid to be processed; and
n is the number of rowids in the internal buffer.

Such a circular buffer has the advantage of not requiring the rowids to be shuffled among the various storage locations, because only the pointers need be changed.

Figure 3:
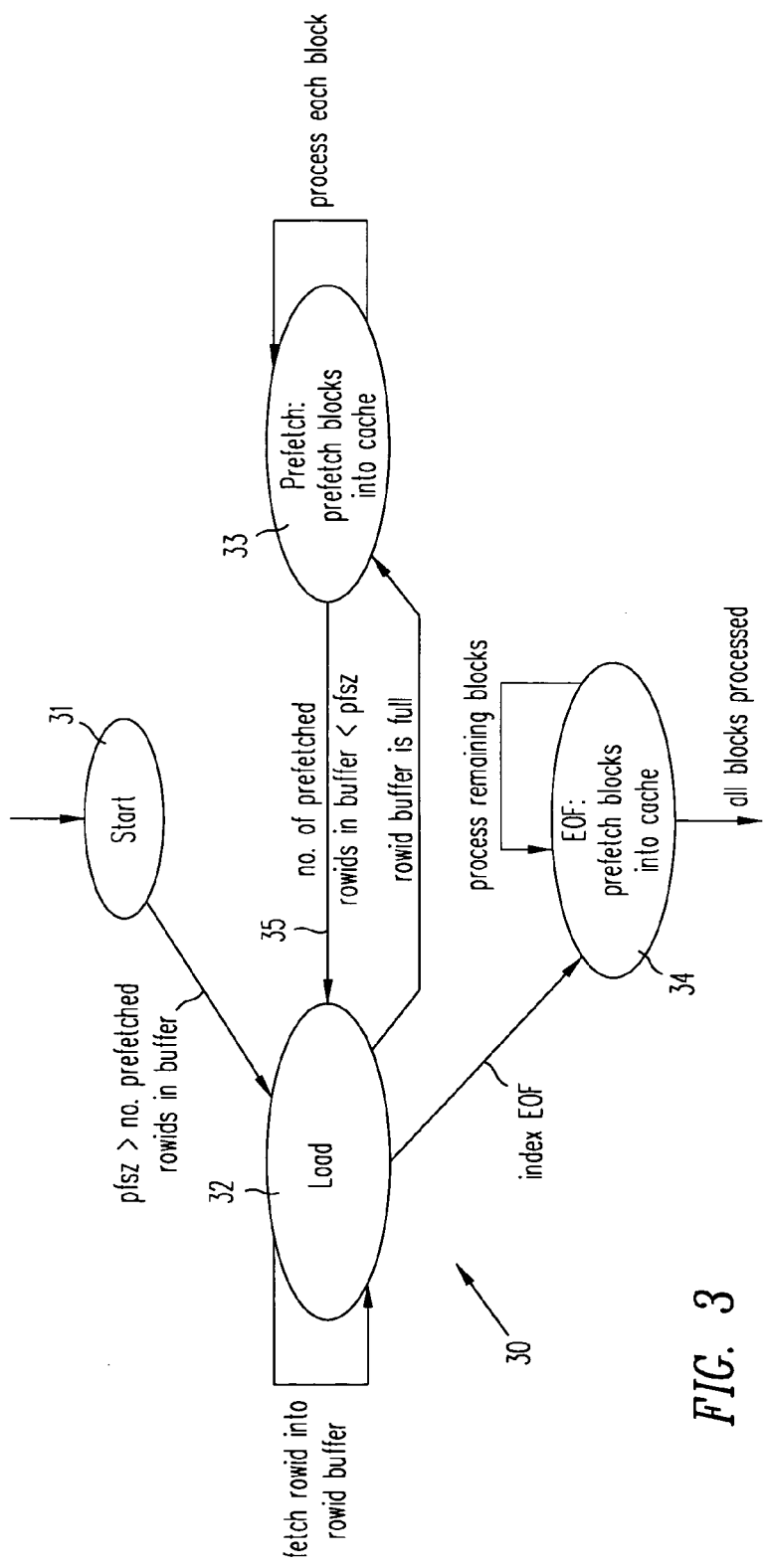
FIG. 3 illustrates, in a state diagram, a state machine used to implement the method of FIG. 2.

Furthermore, although the transition 35 has been illustrated in FIG. 3 as being performed when prefetch size pfsz is smaller than the number of prefetched rowids in the internal buffer, other conditions may be applied in other embodiments. While such other conditions may be alternatives to the above-discussed condition, in one embodiment the above-described condition is modified as follows: pfsz is replaced by the function min(pfsz, row guarantee, and internal buffer size bsz), wherein row guarantee is specified by the user, to identify the minimum number of rows that should be returned by the database.

In one embodiment, a set of software instructions (also referred to as "prefetch size daemon") automatically (either periodically or asynchronously in response to an event) update the prefetch size 14 (FIG. 5) that is used by each of queries 11A-11Z to determine the amount of prefetching to be done. Specifically, one such prefetch size daemon 15 maintains statistics in a buffer (also called "history buffer") 16 (FIG. 5) in a database application. Such a prefetch size daemon 15 may be activated periodically through a timeout action, for example, by a background process. When activated, prefetch size daemon 15 makes a new entry in history buffer 16, and depending on the size of the history buffer, a fixed number of the most recent entries are maintained. Each entry in the history buffer 16 contains the following information:

| | |
|---|---|
| T | Timestamp at which this entry was created. |
| NO | Number of prefetch operations since the last timestamp. |
| NP | Number of blocks prefetched since the last timestamp. |
| NW | Number of prefetched blocks that were wasted - this refers to blocks that were prefetched but had to be aged out before they could be used. |
| pfsz | Prefetch size (this is a value computed by this prefetch size daemon) |
| NC | Number of prefetching clients (as a snapshot at the time this prefetch size daemon 15 is executed) |
| NB | Number of buffers being read at this time. |

Prefetch size daemon 15 uses history buffer 16 to determine the prefetch size 14. Prefetch size daemon 15 uses a fixed number of the last few entries in history buffer 16 to compute the cumulative number of prefetch operations, prefetched blocks and wasted prefetch blocks over a fixed window (e.g. 15 seconds). It then applies the following rules to adjust the prefetch size 14:

If there are not prefetched blocks, then set the prefetch size to MP/NC where MP is the prefetch quota (in number of buffers) and NC is the number of clients performing prefetching If there are prefetched blocks and some of them were wasted. In this case, the limit is reduced by the fraction (NP−NW)/NP where NP is the number of blocks prefetched over the history window and NW is the number of prefetched blocks that were wasted. If NW happens to be greater than NP, this implies that the buffers that were prefetched before the history window were wasted in this time interval. In this case, prefetch size daemon 15 reduces the limit to half its value.

If there are no wasted prefetch blocks, then there are 3 cases:
(a) The number of clients has gone down—in this case prefetch size daemon 15 doubles the prefetch size. If this causes any wasted prefetches it will be reduced by that fraction in the next timeout. Note that the increase is limited by the ratio (MP/NC') where MP is the overall prefetch quota and NC' is the new number of clients.

(b) The number of clients has increased—retain the limit as long as it is less then (MP/NC') (same ratio as above). If not, set it to MP/NC'

(c) The number of clients remains the same—The prefetch size is doubled if the number of prefetched buffers has decreased by atleast 25% (again subject to the MP/NC limit), otherwise the prefetch size is retained. The rationale is that if the number of prefetched buffers has gone down, the clients have reduced their prefetching, so increasing the prefetch size may not lead to wasted prefetches.

Note that if the increase in the prefetch size leads to wasted prefetching, then at the next timeout, the prefetch size will be reduced by the fraction of the prefetched blocks that were wasted.

Figure 6A:
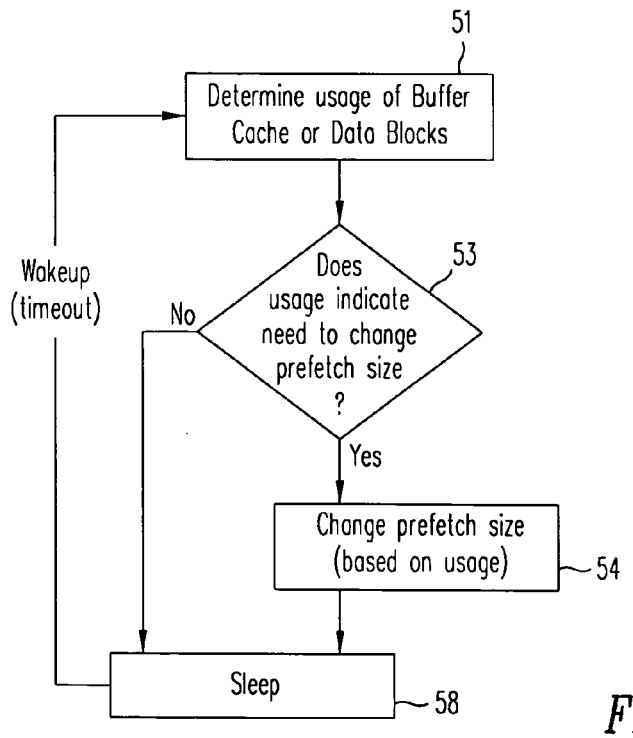
FIGS. 6A and 6B illustrate, in a high-level flow chart and a low-level flow chart respectively, acts performed by two embodiments of a prefetch size daemon of the type illustrated in FIG. 5.

In one specific embodiment, prefetch size daemon 15 implements the following logic every 3 seconds, to update the prefetch size 14 based on load in the buffer cache:

If (NC=0)
pfsz=MP;
else
if ((sum of NW for 15 seconds)>0)
pfsz=pfsz*((sum of NP for 15 seconds)−(sum of NW for 15 seconds))/(sum of NP for 15 seconds)
else
if (NC not decreased)
pfsz=min(pfsz*2, MP/NC);
else
pfsz=min(pfsz, MP/NC);

Prefetch size daemon 15 of one embodiment determines usage of the buffer cache and/or usage of data blocks (as per act 51 in FIG. 6A). For example, in act 51, daemon 15 could look at the number of clients, or a ratio of prefetched blocks that have been used v/s total number of prefetched blocks, or alternatively by number of blocks prefetched but aged out before use. Next, in act 53, prefetch size daemon 15 of this embodiment checks if the usage indicates a need to change the prefetch size. Such a check can be implemented based on, for example, the usage exceeding a threshold (e.g. if the number of clients changes from the previous iteration). If so, then the prefetch size is changed (see act 54) based on the usage, forming a feedback loop. If the decision in act 53 is no, then daemon 15 goes to act 58 to sleep until it is time for the next iteration. Daemon 15 also goes to act 58 after act 54. On an appropriate timeout, it goes from act 58 back to act 51.

Figure 6B:
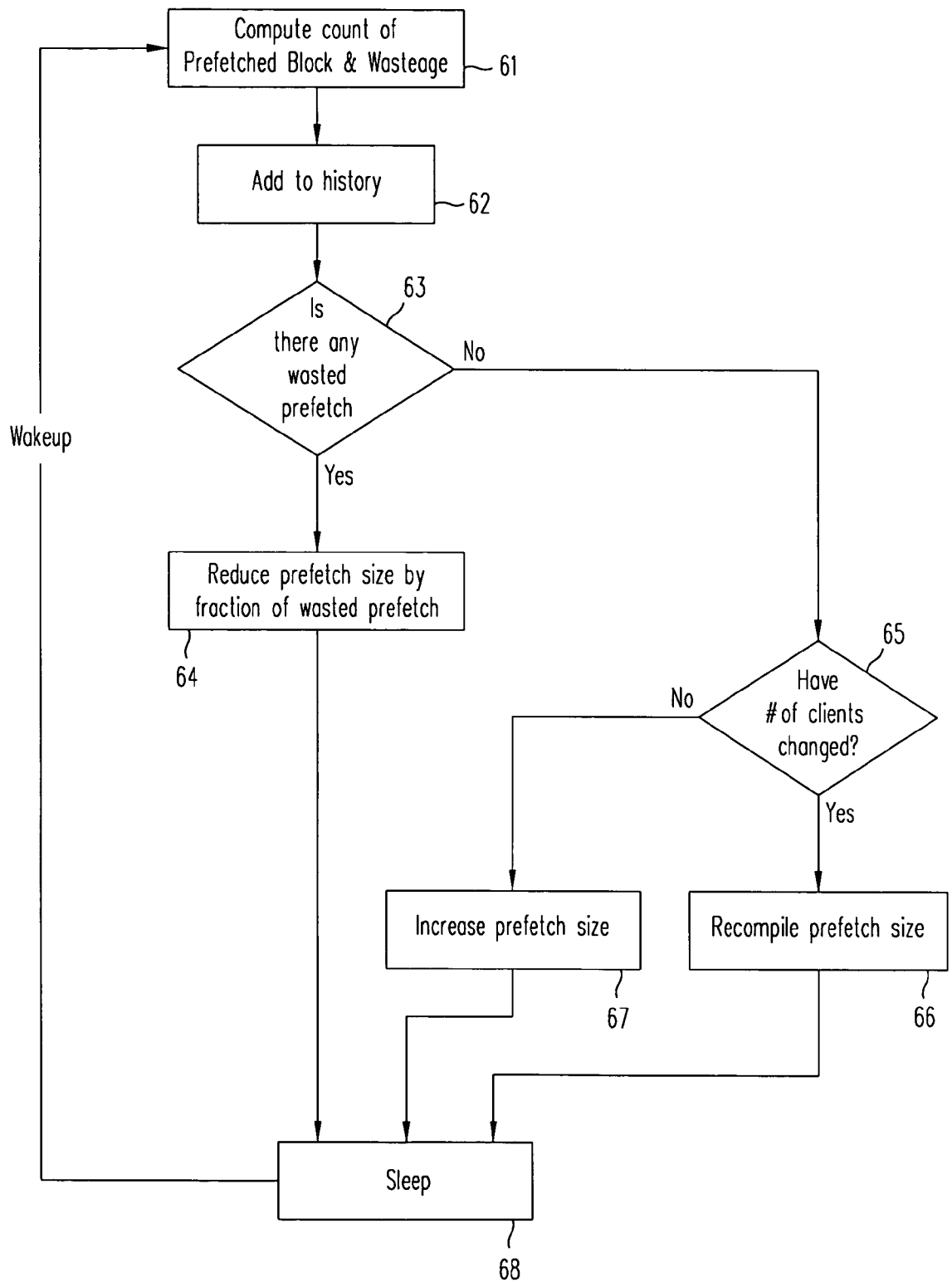

An alternative embodiment of prefetch size daemon 15 performs the following acts, illustrated in FIG. 6B. In act 61, it computes a count of prefetched blocks and wasteage; in act 62 it adds the count to its history, and goes to act 63. In act 63, it checks if there is any wasted prefetch? If so, it goes to act 64 to reduce prefetch size by fraction of wasted prefetches, and thereafter goes to sleep in act 68. In act 63 if the decision was no, it goes to act 65 and checks if the number of clients has changed? If so, it goes to act 66 and recomputes prefetch size with new number of clients. If not, it goes to act 67 and increases prefetch size. At the end of each of acts 67 and 66, it goes to act 68 to sleep for a fixed time period. On an appropriate timeout, it goes from act 68 back to act 61.

Therefore, prefetch size daemon 15 can improve response times of queries significantly in some cases during table lookup. When an index access path is chosen and the query can not be satisfied by the index alone, the data blocks pointed by the rowid need to be fetched. This rowid to data row access (table lookup) is improved using adaptive prefetching in reading an array of blocks which are pointed by an array of qualifying rowids limited to the number of blocks being read to the prefetch size pfsz. Such adaptive prefetching allows better utilization of the I/O capacity and reduction in response time by issuing reads in parallel, but only when possible (and not irrespective of system load). Adaptive prefetching (using a prefetch size daemon) is useful when an index is poorly clustered and the table access tends to involve random disk accesses with an overall poor buffer cache hit ratio. In such cases, the query can easily become I/O bound, waiting for single blocks to be read into the cache synchronously, even though there may be available I/O bandwidths on the system. Adaptive prefetching therefore helps a database instance better utilize the I/O resources in a computer.

Numerous modifications and adapatations of the embodiments described herein will be apparent to the skilled artisan in view of the disclosure.

For example, although certain specific formulae have been provided for computation of the prefetch size, another formula may be used in other embodiments. Such other formula may eliminate dependence on one or more of the statistics described herein. As another example, an operating system can implement one or more features described herein, e.g. for its own buffer cache (i.e. the possible embodiments are not limited to just the database's buffer cache).

Some embodiments include a computer-readable storage medium encoded with a sequence of instructions to perform the following acts: determining usage of a buffer cache; and prefetching into the buffer cache, blocks of data whose number is limited at least in part by usage of the buffer cache.

Several embodiments include a computer readable storage medium that has at least first storage location encoded with a quota for total memory to be used by a buffer cache, a second storage location encoded with a limit on a number of blocks of data to be prefetched by each query, and a third storage location encoded with a number of clients of the buffer cache that perform prefetch. In some embodiments, the just-described computer-readable storage medium also has a fourth storage location encoded with an instruction to prefetch blocks of data no more in number than the limit. In certain embodiments of the computer-readable storage, the limit is set to the quota divided by the number of clients. The computer-readable storage medium further includes a database containing the data, in many embodiments.

Therefore, numerous such modifications and adaptations of the embodiments, examples and implementations described herein are encompassed by the attached claims.

The invention claimed is:

1. A method implemented in a computer, the method comprising:
determining usage of a buffer cache;
prefetching into the buffer cache, blocks of data equal in number to a prefetch size; and
changing said prefetch size depending at least partially on a fraction of said prefetched blocks that are wasted without use.

2. The method of claim 1 wherein:
the determining is done periodically.

3. The method of claim 1 wherein:
the determining is done in response to an asynchronous event.

4. The method of claim 1 wherein:
said changing of prefetch size further depends at least partially on a number of clients; and said clients receive at least some data in said prefetched blocks from said computer.

5. The method of claim 1 wherein:
the prefetching is performed only on satisfaction of a condition based on at least one of the following: (a) cache miss rate and (b) clustering.

6. A method implemented in a computer that supports a plurality of clients, the method comprising:
determining usage of a buffer cache;
prefetching into the buffer cache, blocks of data equal in number to a prefetch size; and
changing said prefetch size at least partially dependent inversely on a number of clients;
wherein said computer currently prefetches data blocks into the buffer cache in response to said clients.

7. The method of claim 6 wherein:
the determining is done periodically.

8. The method of claim 6 wherein:
the determining is done in response to an asynchronous event.

9. The method of claim 6 wherein:
the prefetching is performed only on satisfaction of a condition based on at least one of the following: (a) cache miss rate and (b) clustering.

10. A method implemented in a computer, said computer comprising a database, the method comprising:
determining usage of a buffer cache; and
prefetching into the buffer cache, blocks of data whose number depends at least in part on usage of the buffer cache;
wherein the prefetching is performed at least when a clustering factor is high, with a low clustering factor indicating that individual rows being fetched are concentrated within fewer blocks in a table of said database, and a high clustering factor indicating that individual rows are scattered rather than being collocated.

11. The method of claim 10 wherein:
the determining is done periodically.

12. The method of claim 10 wherein:
the determining is done in response to an asynchronous event.

13. A method implemented in a computer that supports a plurality of clients, the method comprising:
prefetching into a buffer cache, at least one block of data in response to at least one request from one client;
determining a fraction of a set of blocks in said buffer cache that have been prefetched and later aged out before use; and
prefetching an additional number of blocks into said buffer cache, said additional number depending at least in part on said fraction.

14. The method of claim 13 wherein:
said prefetching of additional number of blocks is performed in response to an additional request.

15. The method of claim 14 wherein:
said computer comprises a database, said database comprising a table, said table comprising a plurality of rows;
said additional number further depends on a number of said rows identified in said additional request.

16. The method of claim 15 wherein:
said prefetchings are performed at least when a predetermined condition is satisfied indicating that individual rows are scattered rather than being collocated.

17. The method of claim 13 wherein:
said additional number further depends on a number of said plurality of clients.

18. The method of claim 13 wherein:
said computer comprises an operating system; and
said determining and said prefetchings are performed by said operating system.

19. The method of claim 13 wherein:
said computer comprises a browser; and
said determining and said prefetchings are performed for said browser.

20. A computer-readable storage medium encoded with a plurality of instructions, said plurality of instructions comprising:
instructions to determine usage of a buffer cache;
instructions to prefetch into the buffer cache, a number of blocks of data;
wherein said number depends on a prefetch size; and
instructions to change said prefetch size depending at least partially on a fraction of said blocks that are prefetched, by said instructions to prefetch, and are wasted without use.

21. A computer-readable storage medium encoded with a plurality of instructions, said plurality of instructions comprising:
instructions to determine usage of a buffer cache of a computer;
instructions to prefetch into the buffer cache, a number of blocks of data;
wherein said number depends on a prefetch size; and
instructions to change said prefetch size at leats partially dependent inversely on a number of clients, which clients receive data from the computer based on said prefetching.

22. A computer-readable storage medium encoded with a plurality of instructions to be executed by a computer, said plurality of instructions comprising:
instructions to determine usage of a buffer cache; and
instructions to prefetch into the buffer cache, blocks of data whose number depends at least in part on usage of the buffer cache;
wherein the instructions to prefetch are executed at least when a clustering factor is high, with a low clustering factor indicating that individual rows being fetched are concentrated within fewer blocks in a table of a database in said computer, and a high clustering factor indicating that individual rows are scattered rather than being collocated.

23. A computer comprising:
a storage medium containing data;
means, coupled to the storage medium, for determining usage of a buffer cache for data in the storage medium; and
means, coupled to the determining means and coupled to the storage medium, for prefetching from the storage medium into the buffer cache, blocks of data equal in number to a prefetch size;
wherein the means for determining includes a storage location indicative of a fraction of said prefetched blocks that are wasted without use.

24. The computer of claim 23 wherein:
the means for determining further comprises another storage location encoded with a number of clients;
the computer prefetching data blocks into the buffer cache in response to requests from said clients.

25. A computer comprising:
a storage medium containing data;
means, coupled to the storage medium, for determining usage of a buffer cache for data in the storage medium; and means, coupled to the determining means and coupled to the storage medium, for prefetching from the storage medium into the buffer cache, blocks of data whose number depends at least in part on usage of the buffer cache;

wherein the means for determining includes a storage location encoded with a number of clients that currently prefetch data blocks into the buffer cache.

26. A computer comprising:

a storage medium containing data of a database;

means, coupled to the storage medium, for determining usage of a buffer cache for data in the storage medium; and means, coupled to the determining means and coupled to the storage medium, for prefetching from the storage medium into the buffer cache, blocks of data whose number depends at least in part on usage of the buffer cache;

wherein the means for prefetching performs prefetching at least when a clustering factor is high, with a low clustering factor indicating that individual rows being fetched are concentrated within fewer blocks in a table of said database, and a high clustering factor indicating that individual rows are scattered rather than being collocated.

27. A computer-readable storage medium encoded with a plurality of instructions, said plurality of instructions comprising:

instructions to prefetch into a buffer cache, at least one block of data in response to at least one request from one client;

instructions to determine a count of blocks in said buffer cache that have been prefetched and later aged out before use; and instructions to prefetch an additional number of blocks into said buffer cache, said additional number depending at least in part on said count.

* * * * *

UNITED STATES PATENT AND TRADEMARK OFFICE
CERTIFICATE OF CORRECTION

PATENT NO. : 7,359,890 B1
APPLICATION NO. : 10/142257
DATED : April 15, 2008
INVENTOR(S) : Ku et al.

Figure 5:
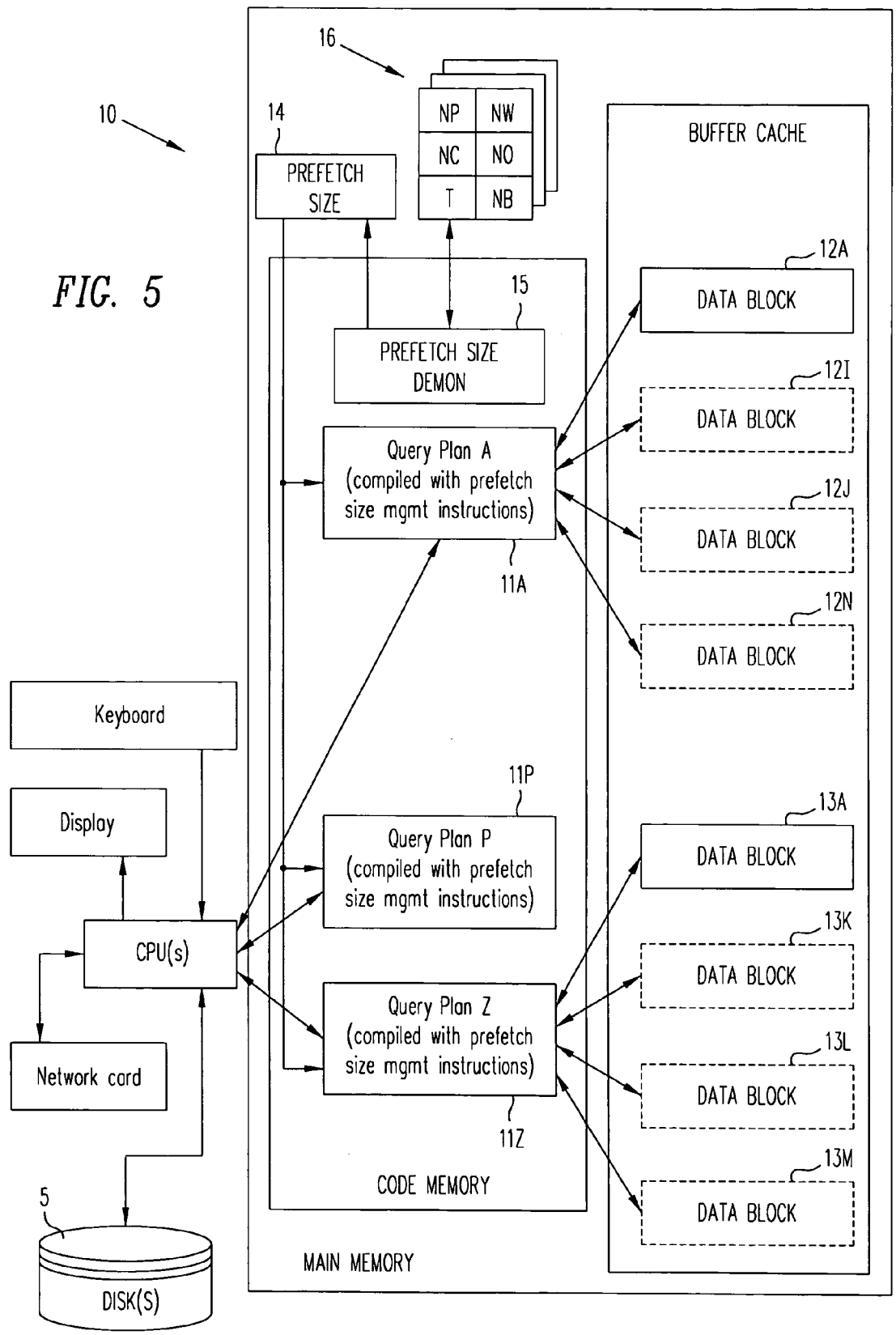
FIG. 5 illustrates, in a block diagram, data and code in memory of one implementation of FIG. 1 that uses software instructions (also called "daemon") to automatically update the prefetch size in response to changes in buffer cache load.

It is certified that error appears in the above-identified patent and that said Letters Patent is hereby corrected as shown below:

On sheet 4 of 5, in Figure 5, Ref. Numeral 15, line 2, delete "DEMON" and insert -- DAEMON --, therefor.

On sheet 5 of 5, in Figure 6B, Ref. Numeral 61, line 2, delete "Wasteage" and insert -- Wastage --, therefor.

In column 1, line 27, delete "of" and insert -- off --, therefor.

In column 1, line 43, delete "oracle app whitepaper" and insert -- oracle_app_whitepaper --, therefor.

In column 1, line 47, delete "the" and insert -- that --, therefor.

In column 2, line 62, delete "on" and insert -- or --, therefor.

In column 3, line 12, delete "embodiment" and insert -- embodiments). The prefetch size may be changed for any reason, although in one specific embodiment --, therefor.

In column 3, line 27, delete "plane" and insert -- plan --, therefor.

In column 3, line 27, delete "in" and insert -- into --, therefor.

In column 3, line 58, delete "CF$\leq$2" and insert -- CF$\geq$2 --, therefor.

In column 4, line 19, delete "disk.." and insert -- disk. --, therefor.

In column 4, line 66, delete "that" and insert -- than --, therefor.

In column 5, line 54, delete "(n=" and insert -- (n- --, therefor.

In column 6, line 33, after "daemon)" insert -- . --.

In column 6, line 35, after "executed)" insert -- . --.

In column 6, line 46, delete "not" and insert -- no --.

UNITED STATES PATENT AND TRADEMARK OFFICE
CERTIFICATE OF CORRECTION

PATENT NO.        : 7,359,890 B1
APPLICATION NO.   : 10/142257
DATED             : April 15, 2008
INVENTOR(S)       : Ku et al.

It is certified that error appears in the above-identified patent and that said Letters Patent is hereby corrected as shown below:

In column 6, line 49, after "prefetching" insert -- . --.

In column 7, line 2, delete "then" and insert -- than --, therefor.

In column 7, line 3, after "NC" insert -- . --.

In column 7, line 6, delete "atleast" and insert -- at least --, therefor.

In column 7, line 49, delete "wasteage" and insert -- wastage --, therefor.

In column 8, line 12, delete "bandwidths" and insert -- bandwidth --, therefor.

In column 8, line 15, delete "adapatations" and insert -- adaptations --, therefor.

In column 10, line 28, in claim 21, delete "leats" and insert -- least --, therefor.

Signed and Sealed this

Tenth Day of November, 2009

David J. Kappos
*Director of the United States Patent and Trademark Office*